(12) United States Patent
Ackerman (10) Patent No.: US 11,922,921 B1
(45) Date of Patent: Mar. 5, 2024

(54) SYSTEMS AND METHODS FOR COMPARING ACOUSTIC PROPERTIES OF ENVIRONMENTS AND AUDIO EQUIPMENT

(71) Applicant: CarMax Enterprise Services, LLC, Richmond, VA (US)

(72) Inventor: Scott Jeffrey Ackerman, Midlothian, VA (US)

(73) Assignee: CARMAX ENTERPRISE SERVICES, LLC, Richmond, VA (US)

( * ) Notice: Subject to any disclaimer, the term of this patent is extended or adjusted under 35 U.S.C. 154(b) by 83 days.

(21) Appl. No.: 17/699,558

(22) Filed: Mar. 21, 2022

Related U.S. Application Data (60) Provisional application No. 63/164,157, filed on Mar. 22, 2021.

(51) Int. Cl.
*G10K 15/08* (2006.01)
*G06F 3/16* (2006.01)
*H04R 1/32* (2006.01)
*H04R 3/00* (2006.01)

(52) U.S. Cl.
CPC ............. *G10K 15/08* (2013.01); *G06F 3/165* (2013.01); *H04R 1/326* (2013.01); *H04R 3/00* (2013.01); *H04R 2499/13* (2013.01)

(58) Field of Classification Search
CPC ........ G10K 15/08; G06F 3/165; H04R 1/326; H04R 3/00; H04R 2499/13
USPC .................... 381/63, 84, 181, 333, 360, 369
See application file for complete search history.

(56) References Cited

U.S. PATENT DOCUMENTS

| | | | |
|---|---|---|---|
| 8,670,850 B2 | 3/2014 | Arthur et al. | |
| 9,591,427 B1 | 3/2017 | Lyren et al. | |
| 2004/0093154 A1* | 5/2004 | Simonds | B60R 16/0315 |
| | | | 701/532 |

OTHER PUBLICATIONS

Max for Live, "Convolution Reverb," accessed via https://www.ableton.com/en/packs/convolution-reverb/ (Mar. 6, 2013).

\* cited by examiner

*Primary Examiner* — Thjuan K Addy
(74) *Attorney, Agent, or Firm* — TROUTMAN PEPPER HAMILTON SANDERS LLP; Christopher J. Forstner; Scott A. Bergeson (57) ABSTRACT

A system for generating a custom audio experience that is configured receive a first audio sample of a first impulse response corresponding to an interior of a vehicle, generate a first convolution reverb from the first audio sample, receive a second audio sample of a second impulse response corresponding to an audio equipment of the vehicle, generate an impulse response module from the second audio sample, generate combination module based on the first convolution reverb and the impulse response module, receive a third audio sample from a user, modify the third audio sample based on the combination module to generate a modified third audio sample, receive an indication of user input to play the modified third audio sample, and cause a user device to output the modified third audio sample.

20 Claims, 5 Drawing Sheets

SYSTEMS AND METHODS FOR COMPARING ACOUSTIC PROPERTIES OF ENVIRONMENTS AND AUDIO EQUIPMENT

CROSS REFERENCE TO RELATED APPLICATIONS

This application claims priority under 35 U.S.C. § 119 to U.S. Provisional Patent Application No. 63/164,157, filed Mar. 22, 2021, the entire contents of which is fully incorporated herein by reference.

FIELD OF THE INVENTION

The present disclosure relates to systems and methods for comparing acoustic properties of environment and audio equipment within the environment, and more particularly systems and methods for generating a customized audio experience of the environment based on the audio equipment within that environment and/or visually comparing acoustic properties of environment and audio equipment within the environment.

BACKGROUND

As users rely on the Internet more and more for their shopping needs, companies are finding ways to differentiate their products online to convert a customer's view to a sale. Audio quality of a vehicle seems to be a factor in converting online views to eventual sales in the automotive space. Customers want to experience how a vehicle's audio equipment sounds in a vehicle prior to purchasing it or deciding to view it in person and want to easily compare one vehicle's audio equipment with another vehicle's audio equipment. No known system to date provides such an experience for users.

Accordingly, there is a need for systems and methods for comparing acoustic properties of environment and audio equipment within the environment based on the audio equipment within that environment and/or visually comparing acoustic properties of environment and audio equipment within the environment. Embodiments of the present disclosure are directed to this and other considerations.

SUMMARY

Disclosed embodiments provide systems and methods for systems and methods for generating a customized audio experience of the environment based on the audio equipment within that environment and/or visually comparing acoustic properties of environment and audio equipment within the environment.

Consistent with the disclosed embodiments, generating a customized audio experience of the environment based on the audio equipment within that environment may include one or more processors and a memory in communication with the one or more processors and storing instructions that, when executed by the one or more processors, are configured to cause the system to perform the steps of a method to generating a customized audio experience. The system may receive a first audio sample of a first impulse response corresponding to an interior of a vehicle. The system may generate a first convolution reverb from the first audio sample, receive a second audio sample of a second impulse response corresponding to an audio equipment of the vehicle, and generate an impulse response module from the second audio sample. The system may generate a combination module based on the first convolution reverb and the impulse response module. The system may also receive a third audio sample from a user, modify the third audio sample based on the combination module to generate a modified third audio sample, receive an indication of user input to play the modified third audio sample, and cause a user device to output the modified third audio sample.

Also consistent with the disclosed embodiments, generating a customized audio experience of the environment based on the audio equipment within that environment may include one or more processors and a memory in communication with the one or more processors and storing instructions that, when executed by the one or more processors, are configured to cause the system to perform the steps of a method to generating a customized audio experience. The system may receive a first audio sample of a first impulse response from an audio system of a vehicle and generate an impulse response module from the first audio sample. The system may receive a second audio sample from a user and modify the second audio sample based on the impulse response module to generate a modified second audio sample. The system may receive an indication of user input to play the modified second audio sample and cause a user device to output the modified second audio sample.

Also consistent with the disclosed embodiments, generating a customized audio experience of the environment based on the audio equipment within that environment may include one or more processors and a memory in communication with the one or more processors and storing instructions that, when executed by the one or more processors, are configured to cause the system to perform the steps of a method to generating and publishing an audio quality score for a vehicle. The system may receive a first audio sample of a first impulse response corresponding to an interior of a vehicle and generate a first convolution reverb from the first audio sample. The system may receive a second audio sample of a second impulse response corresponding to an audio equipment of the vehicle and generate an impulse response module from the second audio sample. The system may generate a combination module based on the first convolution reverb and the impulse response module. The system may determine and assign an audio quality score to the vehicle based on acoustic properties of the combination module and publish the audio quality score to a webpage associated with the vehicle.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various embodiments and aspects of the disclosed technology and, together with the description, serve to explain the principles of the disclosed technology. In the drawings.

DETAILED DESCRIPTION

The exemplary systems, methods, and computer-readable media disclosed herein may provide numerous advantages. Notably, they may function with little user input, and provide audio results that are customized to increase the marketability of the goods, avoid customer confusion about the products being sold, and increase brand and merchant recognition.

Reference will now be made in detail to exemplary embodiments of the disclosed technology, examples of which are illustrated in the accompanying drawings and disclosed herein. Wherever convenient, the same reference numbers will be used throughout the drawings to refer to the same or like parts.

Figure 1:
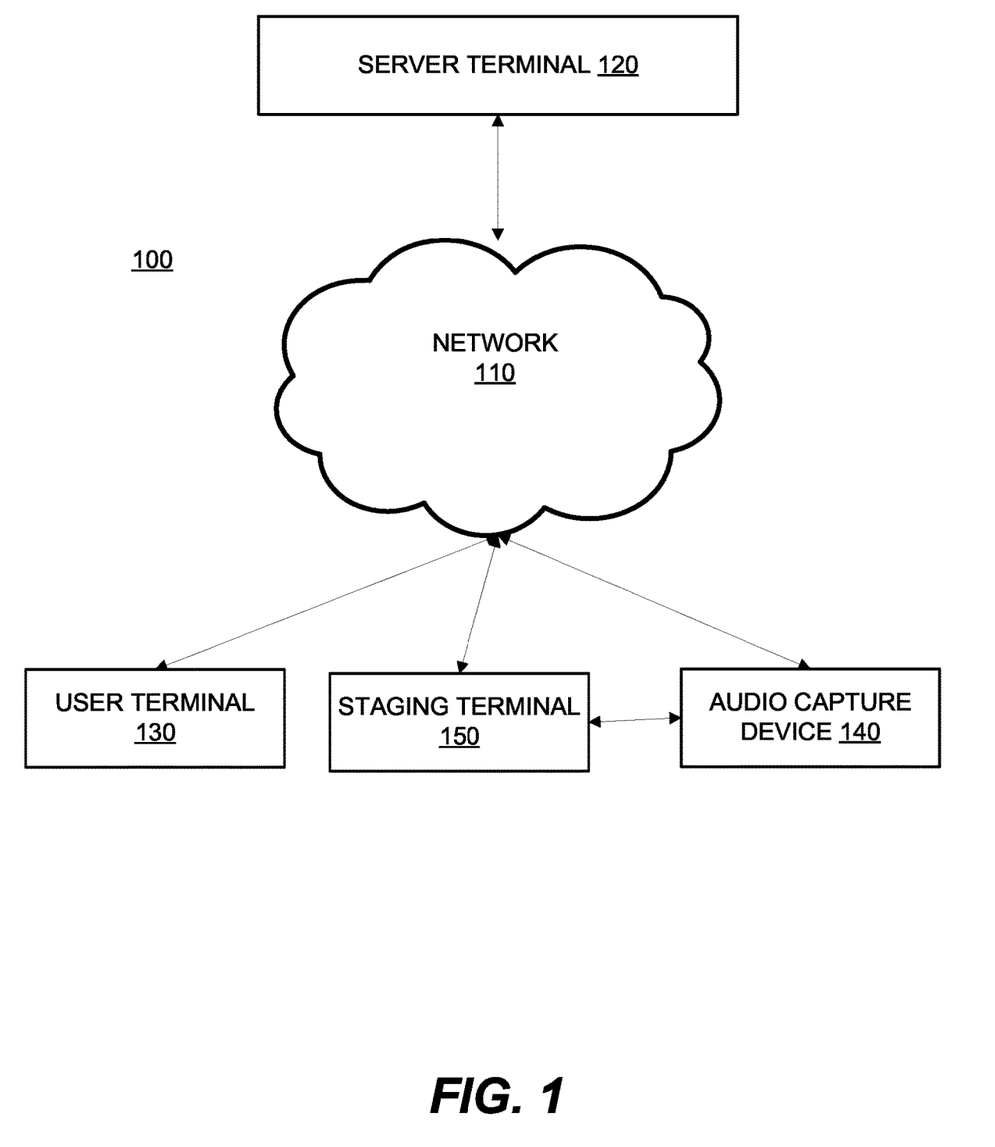
FIG. 1 is a diagram of a system according to an exemplary embodiment of the disclosed technology.

FIG. 1 is a diagram of a system according to an exemplary embodiment of the disclosed technology. The components and arrangements shown in FIG. 1 are not intended to limit the disclosed invention as the components used to implement the disclosed processes and features may vary. In accordance with the disclosed embodiments, a system 100 may include a server terminal 120, which may serve as a central node between other nodes, in communication with a user terminal 130, an audio capture device 140, and a staging terminal 150 via a network 110. Although FIG. 1 only illustrates a single server terminal 120, a single user terminal 130, a single staging terminal 150, and a single audio capture device 140, it is intended that the disclosed system 100 may include a plurality of server terminals 120, a plurality of user terminals 130, a plurality of audio capture devices 140, a plurality of staging terminals 150, or combinations thereof. In some embodiments, user terminal 130 and audio capture device 140 may include a combined device, such as a mobile computing device with audio capture capabilities.

Figure 2:
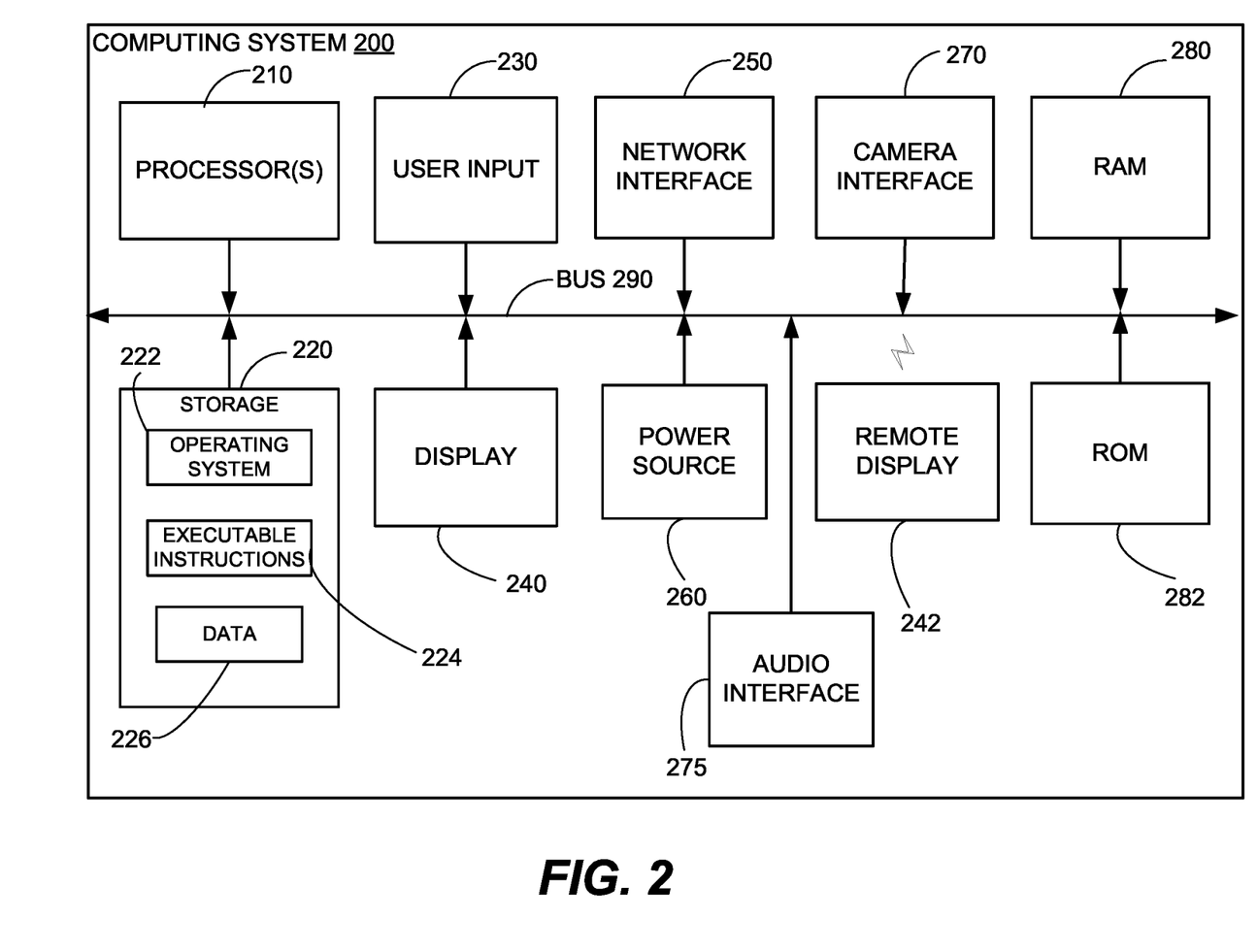
FIG. 2 depicts a computing system architecture according to an exemplary embodiment of the disclosed technology.

Server terminal 120, user terminal 130, and staging terminal 150 may each include one or more mobile computing devices (e.g., tablet computers or portable laptop computers) or stationary computing devices (e.g., stationary desktops), and have components and functionalities as described in more detail with respect to FIG. 2.

Network 110 may be of any suitable type, including wireless or wired individual connections via the internet such as cellular or WiFi™ networks. In some embodiments, network 110 may connect terminals using direct connections such as radio-frequency identification (RFID), near-field communication (NFC), Bluetooth®, low energy Bluetooth® (BLE), WiFi™, ZigBee®, ambient backscatter communications (ABC) protocols, USB, or LAN.

Audio capture device 140 may be, for example, a microphone or a device such as a transducer that converts sound into an electrical signal. The microphone may any suitable type such as a condenser microphone, a dynamic microphone (or moving-coil microphone), a ribbon microphone, a piezo microphone, a fiberoptic microphone, a laser microphone, a liquid microphone (e.g., water microphone), and a microelectromechanical systems (MEMS) microphone. The audio capture device may include a digital audio interface that directly output a digital audio stream rather than an analog output. In some embodiments, the digital microphone interface may adhere to the Audio Engineering Society standard AES42. The audio capture device 140 may communicate with the user terminal 130, staging terminal 150, and/or server terminal 120 via the network 110 to provide a digital audio steam to the user terminal 130, staging terminal 150, and/or server terminal 120 via the network 110 for recording/storing and eventual processing. Additionally, or alternatively, the audio capture device 140 may communicate with the staging terminal directly (e.g., via a wired connection) for recording/storing and eventual processing.

In some embodiments, the customized audio experience generation methods and the visual comparison methods of acoustic properties of environment and audio equipment within an environment may be performed in part or entirely by the user terminal 130, staging terminal 150, and server terminal 120. For example, in some embodiments, server terminal 120, the user terminal 130, or the staging terminal 150 may perform most or all of the receiving and processing steps before outputting an audio playback for the user that is customized to a particular vehicle's sound system and environment or generating and publishing an audio quality score for a particular vehicle's sound system and environment. In further embodiments, user terminal 130, server terminal 120, and/or the staging terminal may each perform some of the audio processing steps. The user terminal 130, server terminal 120, and the staging terminal 150 may include more or fewer of the components disclosed in FIG. 2, enabling the user terminal 130, the server terminal 120, and the staging terminal 150 to perform the steps of the disclosed methods.

A computing device architecture 200 is illustrated in FIG. 2, and embodiments of the disclosed technology may include a computing device with more or fewer components than those shown. It will be understood that computing device architecture 200 is provided for example purposes only and does not limit the scope of the various embodiments of the present disclosed systems, methods, and computer-readable mediums.

As shown, computing device architecture 200 may include a central processing unit (CPU) 210, where computer instructions may be processed; a display interface 240 that supports a graphical user interface and provides functions for rendering video, graphics, images, and texts on the display. In certain example embodiments of the disclosed technology, display interface 240 may connect directly to a local display, such as a desktop monitor. Although not shown, in some embodiments, the computing device architecture 200 includes one or more graphics processing units (GPUs) in place of or in addition to the CPU 210. In another example embodiment, display interface 242 may be configured for providing data, images, and other information for an external/remote display that is not necessarily physically connected to the mobile computing device. For example, a desktop monitor may be utilized for mirroring graphics and other information that is requested from remote server. In certain example embodiments, display interface 242 wirelessly communicates, for example, via a Wi-Fi™ channel, Bluetooth™ connection, or other available network connection interface 250 to the external/remote display.

In an example embodiment, network connection interface 250 may be configured as a wired or wireless communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, another like communication interface, or any combination thereof.

Computing device architecture 200 may include a user input 230 that provides a communication interface to a physical or virtual keyboard. Computing device architecture 200 may be configured to use one or more input components via one or more of input/output interfaces (for example, keyboard interface 230, display interface 240, network connection interface 250, a camera interface 270, audio interface 275 etc.) to allow computing device architecture 200 to present information to a user and capture information from a device's environment including instructions from the device's user. The input components may include a mouse, a trackball, a directional pad, a track pad, a touch-verified track pad, a presence-sensitive track pad, a presence-sensitive display, a scroll wheel, a digital camera, a digital video camera, a web camera, and the like. Additionally, an input component may be integrated with the computing device architecture 200 or may be a separate device.

In example embodiments, network connection interface 250 may support a wireless communication interface to a network (e.g., network 110). As mentioned above, display interface 240 may be in communication with network connection interface 250, for example, to provide information for display on a remote display 242 that is not directly connected or attached to the system. In certain embodiments, camera interface 270 may be provided that acts as a communication interface and provides functions for capturing digital images from a camera. In other embodiments, audio interface 275 may be provided that acts as a communication interface and provide functions for capturing digital audio from a microphone. According to example embodiments, a random access memory (RAM) 280 may be provided, where computer instructions and data may be stored in a volatile memory device for processing by the processor(s) 210 or GPU(s).

According to example embodiments, computing device architecture 200 may include a read-only memory (ROM) 282 where invariant low-level system code or data for basic system functions such as basic input and output (I/O), startup, or reception of keystrokes from a keyboard may be stored in a non-volatile memory device. According to example embodiments, computing device architecture 200 may include a storage medium 220 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), for storing files including an operating system 222, application programs (including, for example, a web browser application, a widget or gadget engine, and or other applications, as necessary), executable instructions 224 (including stored programs or machine learning models that enable various operations of the disclosed method in e.g., method 300), and data files 226, which may include images and associated metadata. According to example embodiments, computing device architecture 200 may include a power source 260 that may provide an appropriate alternating current (AC) or direct current (DC) to power components.

According to an example embodiment, processor 210 may have appropriate structure to be a computer processor. In one arrangement, processor 210 may include more than one processing unit. RAM 280 may interface with a computer bus 290 to provide quick RAM storage to the processor 210 during the execution of software programs such as the operating system, application programs, and device drivers. More specifically, processor 210 may load computer-executable process steps from storage medium 220 or other media into a field of RAM 280 to execute software programs. Data may be stored in RAM 280, where computer processor 210 may access data during execution. In one example configuration, and as will be understood by one of skill in the art, computing device architecture 200 may include sufficient RAM and flash memory for carrying out processes relating to the disclosed technology.

Storage medium 220 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, a solid state drive (SDD), an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media may allow a computing device to access computer-executable process steps, application programs and the like, stored on removable and non-removable memory media, to off-load data from the device or to upload data onto the device. A computer program product, such as one utilizing an image cropping system, may be tangibly embodied in storage medium 220, which may include a non-transitory, machine-readable storage medium.

According to example embodiments, the term "computing device," as used herein, may be a processor, or conceptualized as a processor (for example, processor 210 of FIG. 2). In such example embodiments, the computing device (processor) may be coupled, connected, and/or in communication with one or more peripheral devices, such as display 240.

In example embodiments of the disclosed technology, a computing device includes any number of hardware and/or software applications that are executed to facilitate any of the operations. In example embodiments, one or more user input interfaces 230 may facilitate communication between the computing device and one or more input/output devices. For example, a universal serial bus port, a serial port, a disk drive, a CD-ROM drive, and/or one or more user interface devices, such as a display, keyboard, keypad, mouse, control panel, touch screen display, etc., may facilitate user interaction with the computing device. The one or more user input interfaces 230 may be utilized to receive or collect data and/or user instructions from a wide variety of input devices. Received data may be processed by one or more computer processors 210 as desired in various embodiments of the disclosed technology and/or stored in one or more memory devices, such as storage medium 220.

One or more network interfaces 250 may facilitate connection of the computing device inputs and outputs to one or more suitable networks and/or connections. For example, the connections that facilitate communication with any number of sensors associated with the system. The one or more network interfaces 250 may further facilitate connection to one or more suitable networks; for example, a local area network, a wide area network, the Internet, a Wi-Fi™ enabled network, a satellite-based network, any wired network, any wireless network, etc., for communication with external devices and/or systems.

Figure 3:
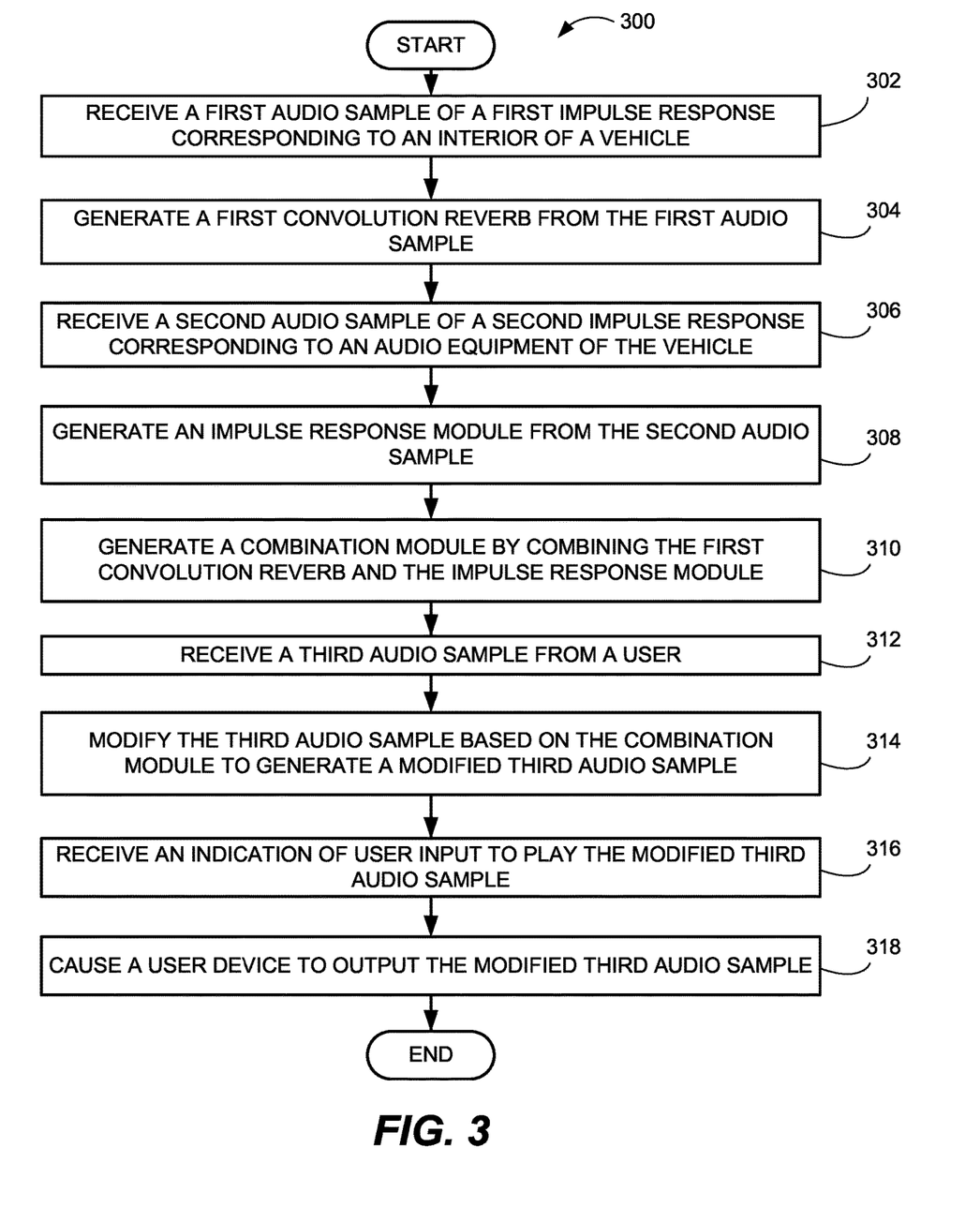
FIG. 3 is a flowchart of an exemplary method for generating customized audio experiences for a vehicle.

FIG. 3 is a flowchart of an exemplary method 300 for generating a customized audio sample for playback that mimics a sound system and environment of a particular vehicle. The steps of method 300 are described below.

In step 302 of method 300, the system (e.g., system 100 or, more specifically, the server terminal 120, the user terminal 130, the staging terminal 150, or combinations thereof) may receive a first audio sample (e.g., from an audio capture device 140 or from another computer such as the server terminal 120, the user terminal 130, or the staging terminal 150) of a first impulse response corresponding to an interior of the vehicle.

The first impulse response of the vehicle's interior may be captured by placing an omnidirectional microphone on a small stand near the center of the vehicle (e.g., on the center console of the vehicle) at an approximate height of driver's seat headrest and connecting that microphone (wirelessly or wired) to a recording device such as a user terminal 130 or other recording device. From backseat, with car engine off, generate an impulse (i.e., an audio burst) using a 20-20 khz burst tone generator at a volume that registers (e.g., −8 db to −1 db such as about −4 db) on the recording device that the microphone is connected to. Once that level is checked and ready, begin recording the microphone and initiate the noise burst a second time. The person or machine generating the burst needs to be very still and quiet during this as to not introduce any ambient noise during the recording.

In step 304, the system (e.g., system 100 or, more specifically, the server terminal 120, the user terminal 130, the staging terminal 150, or combinations thereof) may generate a first convolution reverb form the first audio sample. The system may have a convolution reverb software algorithm that may make this conversion. In some embodiments, the system may edit or reduce the first audio sample by trimming non-audible portions and removing the non-audible samples from the first audio sample. The trimmed first audio sample may be converted into the first convolution reverb. Regardless, the first convolution reverb may be tagged (i.e., associated with the vehicle) when stored. In some embodiments, the convolution reverb is a convolution filter that may be used to filter audio to mimic the acoustics of the interior of the vehicle.

In step 306, the system (e.g., system 100 or, more specifically, the server terminal 120, the user terminal 130, the staging terminal 150, or combinations thereof) may receive a second audio sample of a second impulse response corresponding to an audio equipment of the vehicle. The second impulse response may be captured with the same or different microphone connected to the same or different recording device as described above (e.g., a user terminal 130). A second user terminal 130 or other digital audio playing device may be connected to the vehicle's stereo system with a wire (e.g., via an auxiliary connection) or a wireless connection (e.g., a wireless signal such as Bluetooth™, WiFi™, Zigbee™, etc.). Additionally, the vehicle's audio settings for tone (e.g., bass, treble, and five-way equalizer) are all set to flat (i.e., the middle position or zero position). The second user terminal 130 or other digital audio playing device may output an audio signal corresponding to a frequency or audio spectrum sweep to the vehicle's audio system to be played through the vehicle's speakers. Using the microphone connected to the recording device, record the output of the audio signal corresponding to the frequency of audio spectrum sweep.

In step 308, the system (e.g., system 100 or, more specifically, the server terminal 120, the user terminal 130, the staging terminal 150, or combinations thereof) may generate impulse response module from the second audio sample. In some embodiments, the system may edit or reduce the second audio sample by trimming non-audible portions and removing the non-audible samples from the second audio sample. The trimmed second audio sample may be converted into the impulse response module. Regardless, the impulse response module may be tagged (i.e., associated with the vehicle) stored. In some embodiments, the impulse response module is a second convolution reverb or a second convolution filter that may be used to filter audio to mimic the acoustics of the audio equipment (e.g., speakers) of the vehicle. In some embodiments, the impulse response module may be a set of parameters or data settings for incoming audio.

In step 310, the system (e.g., system 100 or, more specifically, the server terminal 120, the user terminal 130, the staging terminal 150, or combinations thereof) may generate a combination module based on the first convolution reverb and the impulse response module. In some embodiments, the combination module may be a new module that has audio properties of both the first convolution reverb and the impulse response module. In other embodiments, the combination module may be an algorithm or other instructions to process one or more received audio samples through the impulse response module and then through the first convolution reverb or vice versa. In still other embodiments, the combination module may maintain the first convolution reverb and the impulse response module separately, but store, tag, associate, or link the first convolution reverb and the impulse response module with one another in storage 220. In some embodiments, the combination module is a combination convolution reverb or a combination convolution filter that combines the first and second convolution reverbs or filters. In some embodiments, the combination module may be a set of parameters or data settings for incoming audio.

In step 312, the system (e.g., system 100 or, more specifically, the server terminal 120, the user terminal 130, the staging terminal 150, or combinations thereof) may receive a third audio sample from a user. The third audio sample may be an indication to stream audio from another remote location (e.g., Spotify or Apple Music) or may be an audio file that is uploaded from a user. Alternatively, the third audio sample may be a royalty free audio sample stored by the system that is selected by the user (see step 316).

In step 314, the system (e.g., system 100 or, more specifically, the server terminal 120, the user terminal 130, the staging terminal 150, or combinations thereof) may modify the third audio sample based on the combination module to generate a modified third audio sample.

In step 316, the system (e.g., system 100 or, more specifically, the server terminal 120, the user terminal 130, the staging terminal 150, or combinations thereof) may receive an indication of user input to play the modified third audio sample.

In step 318, in response to the indication of user input, the system (e.g., system 100 or, more specifically, the server terminal 120, the user terminal 130, the staging terminal 150, or combinations thereof) may cause a user device to output the modified third audio sample.

The modified third audio sample and receipt of the user input may be made via a native application to the user terminal 130 (e.g., a mobile app) to utilizes the user terminal's 130 audio capabilities. For optimal listening experience, the native application should be used for simulating listening to music or other audio the car's sound system characteristics in a simulation of the actual car. Although the audio played via a web application or webpage is possible, the web application or webpage may have less capabilities and options for playback than the native software application. The native software application may accept an audio signal (streaming or static file) and process it using a built-in convolution reverb module and an impulse response module. The reverb module will have the abilities to load recorded samples of the specific vehicle's interior acoustic properties, and the impulse response module will have the ability to load recorded samples of the specific car's speaker properties. The consumer will then be able to link an audio signal (stream or file), or could choose some royalty free audio that we provide for them, and that will then be fed into the native application, processed through the impulse response module with the stored impulse response sample (speaker profile) loaded, and then into the convolution reverb module with the stored reverb sample loaded, giving the consumer a very accurate simulation of what audio through that specific car's speakers in that specific car's acoustic environment sounds like.

Additionally, the user of user device 130 may be presented with a user interface generated by the system. The user interface may provide the user with the ability to change the tonal capabilities associated with the particular vehicle. For example, the user could, via the user interface, adjust the treble, bass, and/or five-band equalizer to change mimic similar changes made to the particular vehicle's stereo system while providing instant (or near instant) changes to the audio the user selected or uploaded for playback. As a more specific example, a user could adjust the bass or treble using the vehicle's specific center frequency, frequency width, cut and boost of those controls. In some embodiments, the system (e.g., system 100 or, more specifically, the server terminal 120, the user terminal 130, the staging terminal 150, or combinations thereof) may receive multiple (e.g., five) frequency sweep samples to enable a user to simulate adjusting the tonal capabilities of a particular vehicle's audio system. For example, a vehicle with a simple two channel equalizer for bass and treble. A user may capture (i) a first frequency sweep with bass and treble controls set at 0, (ii) a second frequency sweep with the bass set at center and treble at 0, (iii) a third frequency sweep with the treble set at 100 and the bass set at center, (iv) a fourth frequency sweep with the treble set at center and the bass set at 0, and (v) a fifth frequency sweep with the treble set at center and the bass set at 100. With a vehicle that has more controls (e.g., a five-band equalizer), the process would ultimately generate eleven recorded frequency sweeps. Each of these recorded frequency sweeps would be received by the system (e.g., system 100 or, more specifically, the server terminal 120, the user terminal 130, the staging terminal 150, or combinations thereof), which would generate multiple convolution reverb corresponding to these recordings which would then be mapped to different controls in the user interface to allow the user to change the tonal properties of their chosen audio sample.

Figure 4:
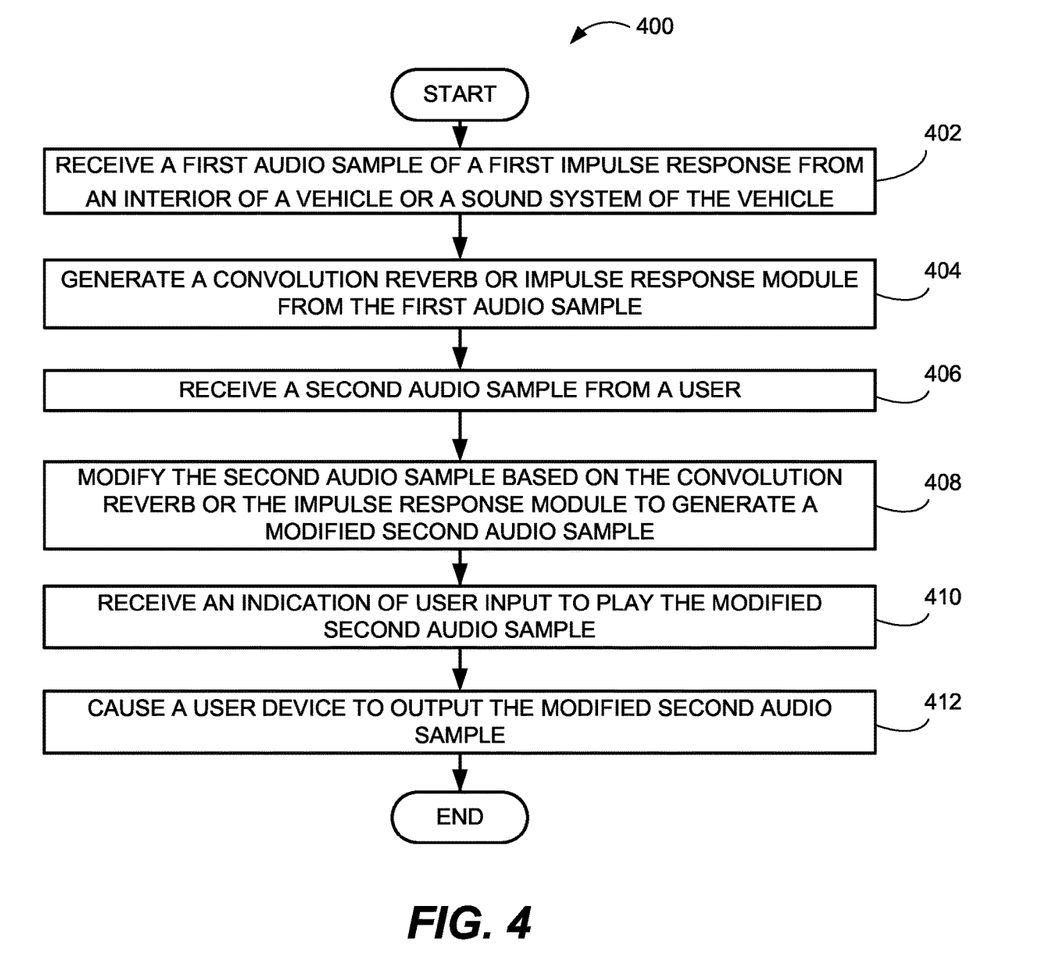
FIG. 4 is a flowchart of another exemplary method for generating customized audio experiences for a vehicle.

FIG. 4 is a flowchart of an exemplary method 400 for generating a customized audio sample for playback that mimics a sound system or an environment of a particular vehicle. The steps of method 400 are described below.

In step 402 of method 400, the system (e.g., system 100 or, more specifically, the server terminal 120, the user terminal 130, the staging terminal 150, or combinations thereof) may receive a first audio sample (e.g., from an audio capture device 140 or from another computer such as the server terminal 120, the user terminal 130, or the staging terminal 150) of a first impulse response corresponding to an interior of the vehicle. In other embodiments, the first impulse response may correspond to the sound system of the vehicle. The first impulse response may be capture in a similar fashion as describe with respect to steps 302 or 306 depending on whether the impulse response corresponds to the interior of the vehicle or the sound system of the vehicle.

In step 404, the system (e.g., system 100 or, more specifically, the server terminal 120, the user terminal 130, the staging terminal 150, or combinations thereof) may generate a first convolution reverb from the first audio sample. In other embodiments, when the impulse response corresponds to the sound system of the vehicle, the system may generate an impulse response module from the first audio sample. In some embodiments, the convolution reverb or impulse response module may be a convolution filter.

In step 406, the system (e.g., system 100 or, more specifically, the server terminal 120, the user terminal 130, the staging terminal 150, or combinations thereof) may receive a second audio sample from a user (e.g., a user device such as user terminal 130).

In step 408, the system (e.g., system 100 or, more specifically, the server terminal 120, the user terminal 130, the staging terminal 150, or combinations thereof) may modify the second audio sample based on the first convolution reverb to generate a modified second audio sample. In other embodiments, the system may generate the modified second audio sample from the impulse response module when the impulse response corresponds to the sound system of the vehicle.

In step 410, the system (e.g., system 100 or, more specifically, the server terminal 120, the user terminal 130, the staging terminal 150, or combinations thereof) may receive an indication of user input to play the modified second audio sample.

In step 412, in response to the indication of user input, the system (e.g., system 100 or, more specifically, the server terminal 120, the user terminal 130, the staging terminal 150, or combinations thereof) may cause a user device to output the modified second audio sample.

Figure 5:
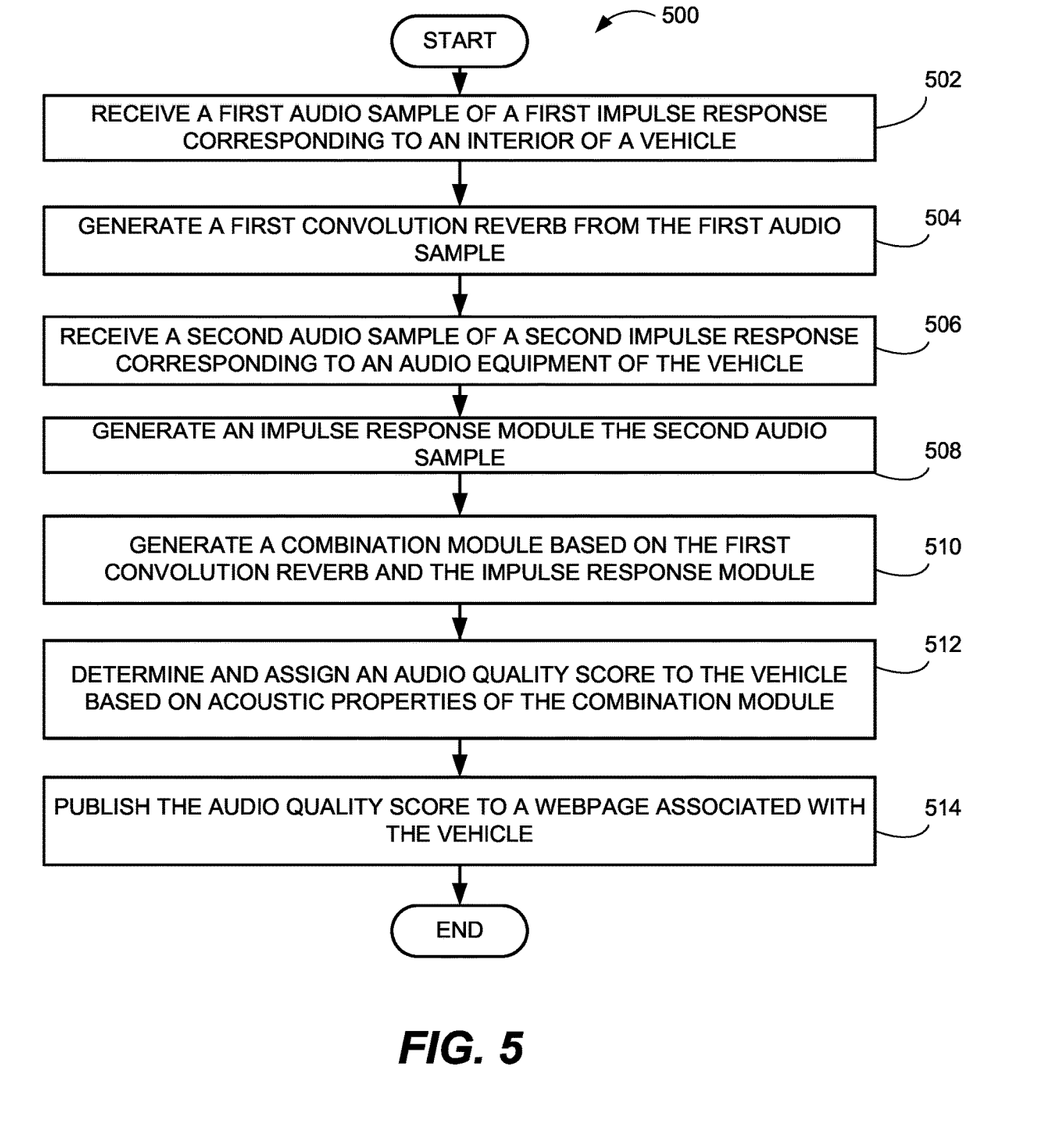
FIG. 5 is a flowchart for a further exemplary method for generating and publishing a score of a vehicle's audio system for comparison with other vehicles.

FIG. 5 is a flowchart of an exemplary method 500 for generating a customized audio sample for playback that mimics a sound system and environment of a particular vehicle. The steps of method 500 are described below.

In step 502 of method 500, the system (e.g., system 100 or, more specifically, the server terminal 120, the user terminal 130, the staging terminal 150, or combinations thereof) may receive a first audio sample (e.g., from an audio capture device 140 or from another computer such as the server terminal 120, the user terminal 130, or the staging terminal 150) of a first impulse response corresponding to an interior of the vehicle.

In step 504, the system (e.g., system 100 or, more specifically, the server terminal 120, the user terminal 130, the staging terminal 150, or combinations thereof) may generate a first convolution reverb form the first audio sample.

In step 506, the system (e.g., system 100 or, more specifically, the server terminal 120, the user terminal 130, the staging terminal 150, or combinations thereof) may receive a second audio sample of a second impulse response corresponding to an audio equipment of the vehicle.

In step 508, the system (e.g., system 100 or, more specifically, the server terminal 120, the user terminal 130, the staging terminal 150, or combinations thereof) may generate an impulse response module from the second audio sample.

In step 510, the system (e.g., system 100 or, more specifically, the server terminal 120, the user terminal 130, the staging terminal 150, or combinations thereof) may generate a combination module based on the first convolution reverb and the impulse response module. In some embodiments, the combination module may be a new module that has audio properties of both the first convolution reverb and the impulse response module. In other embodiments, the combination module may be an algorithm or other instructions to process received audio samples through the impulse response module and then the first convolution reverb or vice versa. In still other embodiments, the combination module may maintain the first convolution reverb and the impulse response module separately, but store, tag, associate, or link the first convolution reverb and the impulse response module with one another in storage 220. In step 512, the system (e.g., system 100 or, more specifically, the server terminal 120, the user terminal 130, the staging terminal 150, or combinations thereof) may determine and assign an audio quality score to the vehicle based on acoustic properties of the combination module. For example, determining an audio quality score may include processing a white noise audio sample through the combination module and analyze the audio properties of the sample while being processed. The flatter the audio sample (e.g., minimal frequencies that are boosted or cut), the higher the score of the system will assign the vehicle's audio system.

In step 514, the system (e.g., system 100 or, more specifically, the server terminal 120, the user terminal 130, the staging terminal 150, or combinations thereof) may publish the audio quality score to a webpage associated with the vehicle. Alternatively, or in addition, the audio quality score may be stored such that it may be retrieved by a native application of a user terminal.

Certain embodiments of the disclosed technology are described above with reference to block and flow diagrams of systems and methods and/or computer program products according to example embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

In this description, numerous specific details have been set forth. It is to be understood, however, that embodiments or aspects of the disclosed technology may be practiced without these specific details. In other instances, well-known methods, structures and techniques have not been shown in detail in order not to obscure an understanding of this description. References to "one embodiment," "an embodiment," "example embodiment," "various embodiment," "some embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiment of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the disclosed technology, including the best mode, and also to enable any person skilled in the art to practice certain embodiments of the disclosed technology, including making and using any devices or systems and performing any incorporated methods. The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for generating a custom audio experience, comprising:
   one or more processors; and
   a memory in communication with the one or more processors and storing instructions that, when executed by the one or more processors, are configured to cause the system to:
      receive a first audio sample of a first impulse response corresponding to an interior of a vehicle;
      generate a first convolution reverb from the first audio sample;
      receive a second audio sample of a second impulse response corresponding to an audio equipment of the vehicle;
      generate an impulse response module from the second audio sample;
      generate a combination module by combining the first convolution reverb and the impulse response module;
      receive a third audio sample from a user;
      modify the third audio sample based on the combination module to generate a modified third audio sample;
      receive an indication of user input to play the modified third audio sample; and
      cause a user device to output the modified third audio sample.

2. The system of claim 1, wherein the first audio sample and the second audio sample each comprise white noise or a frequency burst.

3. The system of claim 1, wherein the third audio sample comprises music.

4. The system of claim 1, wherein the first audio sample is received via an omnidirectional microphone located at a center of the vehicle and a height equal to a headrest.

5. The system of claim 1, wherein the memory comprises further instructions configured to cause the system to:
   modify the first audio sample by removing non-audible samples from the first audio sample prior to generating the first convolution reverb.

6. The system of claim 1, wherein the memory comprises further instructions configured to cause the system to tag the first audio sample with the vehicle.

7. The system of claim 1, wherein the memory comprises further instructions configured to cause the system to store the tagged first convolution reverb.

8. The system of claim 1, wherein audio settings of the audio equipment of the vehicle are set to flat.

9. The system of claim 1, wherein the second audio sample is received via an omnidirectional microphone located at a center of the vehicle and a height equal to a headrest.

10. The system of claim 1, wherein the memory comprises further instructions configured to cause the system to:
    modify the second audio sample by removing non-audible samples from the first audio sample prior to generating the first convolution reverb.

11. The system of claim 1, wherein the combination module is the first impulse response and the first convolution reverb so that the third audio sample is modified by the first impulse response followed by the first convolution reverb.

12. The system of claim 1, wherein the memory comprises further instructions configured to cause the system to:
    receive one or more audio samples of associated with frequency sweeps of the audio equipment of the vehicle;
    generate one or more additional convolution reverbs;
    map the one or more additional convolution reverbs to one or more tonal selections;
    receive an indication of user input corresponding to the one or more tonal selections;
    modify the third audio sample to generate a fourth audio sample based on the indication of user input corresponding to the one or more tonal selections; and
    cause a user device to output the fourth audio sample.

13. A system for generating a custom audio experience, comprising:
    one or more processors; and
    a memory in communication with the one or more processors and storing instructions that, when executed by the one or more processors, are configured to cause the system to:
       receive a first audio sample of a first impulse response from an interior of a vehicle;
       generate a first convolution reverb from the first audio sample;
       receive a second audio sample from a user;
       modify the second audio sample based on the first convolution reverb to generate a modified second audio sample;
       receive an indication of user input to play the modified second audio sample; and
       cause a user device to output the modified second audio sample.

14. The system of claim 13, wherein the first audio sample comprises white noise or a frequency burst.

15. The system of claim 13, wherein the second audio sample comprises music.

16. The system of claim 13, wherein the memory comprises further instructions configured to cause the system to:
    receive one or more audio samples of associated with frequency sweeps of the audio equipment of the vehicle;
    generate one or more additional convolution reverbs;
    map the one or more additional convolution reverbs to one or more tonal selections;
    receive an indication of user input corresponding to the one or more tonal selections;
    modify the second audio sample to generate a third audio sample based on the indication of user input corresponding to the one or more tonal selections; and
    cause a user device to output the third audio sample.

17. The system of claim 13, wherein the memory comprises further instructions configured to cause the system to:
    modify the first audio sample by removing non-audible samples from the first audio sample prior to generating the first convolution reverb.

18. A system for generating a custom audio experience, comprising:
    one or more processors; and
    a memory in communication with the one or more processors and storing instructions that, when executed by the one or more processors, are configured to cause the system to:

receive a first audio sample of a first impulse response corresponding to an interior of a vehicle;

generate a first convolution reverb from the first audio sample;

receive a second audio sample of a second impulse response corresponding to an audio equipment of the vehicle;

generate an impulse response module from the second audio sample;

generate a combination module based on the first convolution reverb and the impulse response module;

determine and assign an audio quality score to the vehicle based on acoustic properties of the impulse response module; and publish the audio quality score to a webpage associated with the vehicle.

19. The system of claim 18, wherein the first audio sample and the second audio sample each comprise white noise or a frequency burst.

20. The system of claim 18, wherein the memory comprises further instructions configured to cause the system to:

modify the first audio sample by removing non-audible samples from the first audio sample prior to generating the first convolution reverb.

* * * * *